United States Patent [19]

Kuchelmeister

[11] Patent Number: 4,847,966
[45] Date of Patent: Jul. 18, 1989

[54] METHOD OF MAKING A MATRIX FOR A CATALYTIC REACTOR FOR THE PURIFICATION OF EXHAUST GAS

[75] Inventor: Reinhold Kuchelmeister, Waldenbuch, Fed. Rep. of Germany

[73] Assignee: Süddeutsche Kühlerfabrik, Julius Fr. Behr GmbH & Co., Fed. Rep. of Germany

[21] Appl. No.: 97,718

[22] Filed: Sep. 17, 1987

[30] Foreign Application Priority Data

Oct. 8, 1986 [DE] Fed. Rep. of Germany ....... 3634235

[51] Int. Cl.$^4$ .............................................. B21D 53/00
[52] U.S. Cl. .................................. 29/157 R; 29/527.1; 228/165; 502/439
[58] Field of Search .......................... 29/157 R, 527.1; 228/165, 174, 183; 502/439; 422/180; 428/116, 593

[56] References Cited

U.S. PATENT DOCUMENTS

| | | | |
|---|---|---|---|
| 4,186,172 | 1/1980 | Scholz | 29/157 R |
| 4,318,888 | 3/1982 | Chapman et al. | 29/157 R |
| 4,381,590 | 5/1983 | Nonnenmann et al. | 29/157 R |
| 4,521,947 | 6/1985 | Nonnenmann et al. | 29/157 R |
| 4,598,063 | 7/1986 | Retallick | 29/157 R |
| 4,719,680 | 1/1988 | Cyron | 29/157 R |
| 4,741,082 | 5/1988 | Kanniainen et al. | 29/157 R |

Primary Examiner—Howard N. Goldberg
Assistant Examiner—Irene Cuda
Attorney, Agent, or Firm—Barnes & Thornburg

[57] ABSTRACT

A matrix for a catalytic reactor for the purification of exhaust gas as well as a process and an arrangement for producing this matrix which has a corrugated metal strip, wound or folded, or a smooth strip and a corrugated metal strip that are wound or folded into several adjacent layers. The wound or folded layers are soldered together with one another. Radially extending indentations of small dimensions are provided at the points of the corrugated strip that border on the adjacent layers. In these indentations soldering material is received.

13 Claims, 3 Drawing Sheets

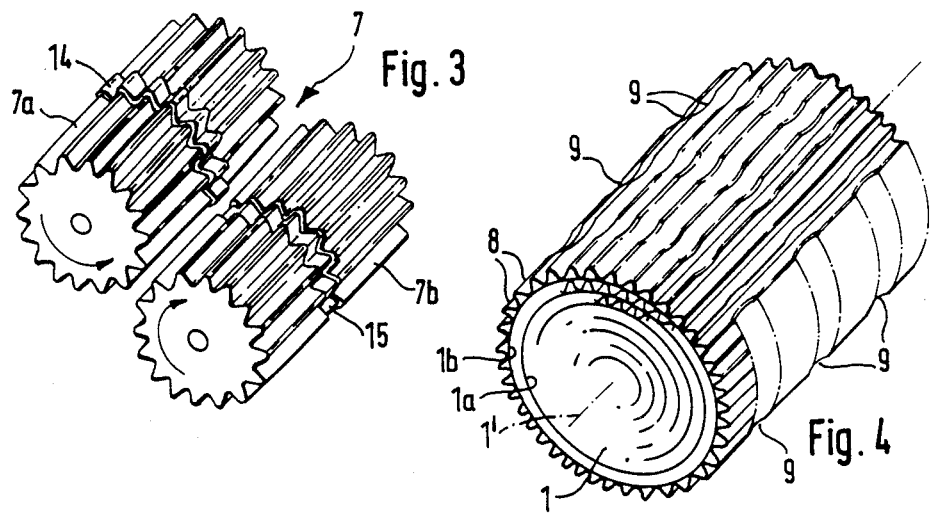
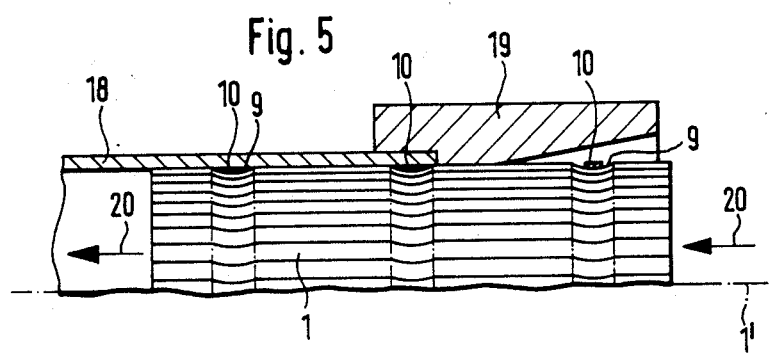
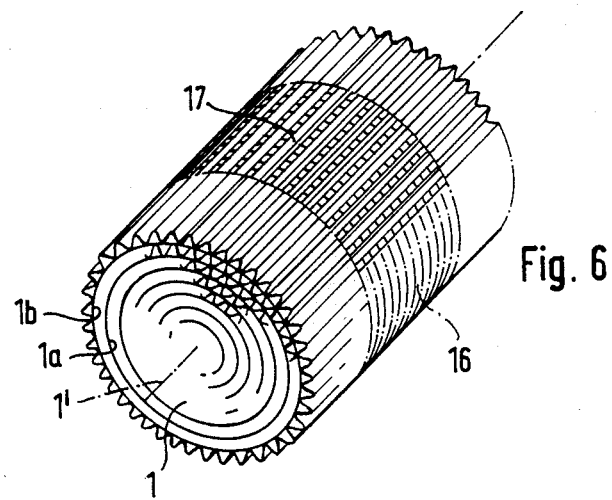

METHOD OF MAKING A MATRIX FOR A CATALYTIC REACTOR FOR THE PURIFICATION OF EXHAUST GAS

BACKGROUND AND SUMMARY OF THE INVENTION

The present invention relates to a matrix for a catalytic reactor for the purification of exhaust gas, particularly for internal-combustion engines, that has either a corrugated or a smooth and a corrugated metal strip that are wound or folded into several layers that are adjacent to one another and are at least partially soldered to one another.

The production of a matrix for a catalytic exhaust gas reactor by winding a smooth and a corrugated metal strip into several layers on top of one another is shown in German Published Unexamined Patent Application No. 2,924,592. In that matrix, between the layers that are wound on top of one another, by means of an application arrangement equipped with rollers, soldering material in strip form and also continuously is applied to the smooth strip or in each case on the extreme elevations of the corrugated strip. The soldering material is then melted in a furnace. It is also known from this text to, instead of soldering material, include soldering strips in the individual windings.

This last-mentioned method has the advantage that this soldering strip, in a relatively easy way, can be wound into the matrix and held by the layers that are located on top of one another, until the matrix is soldered in the furnace. However, it is a disadvantage that the matrix, because of the winding-in-between of soldering strip, even if it has only a small thickness of fractions of a millimeter, increases its diameter as a result of the winding of several layers on top of one another. Further, during the soldering process in which the wound-in solder melts, a settling takes place that may result in an uncontrolled change of the diameter of the matrix that can then no longer, or at least not in the required manner, be pressed into a shell.

As a rule, a soldering-together of the individual layers over the whole axial length of the matrix did no take place, and only the front sides of the wound matrix was dipped into a soldering bath so that the matrix in each case was soldered together only at the front sides. It was found that this soldering-together at the front sides is not sufficient in all cases.

The objective of the present invention is to provide a matrix for a catalytic reactor for the purification of exhaust gas which will not change diameter during the winding process, the folding process, nor during a subsequent soldering process.

This and other objectives ar achieved in the present invention by providing a matrix which has at the areas of the corrugated strip that border on the adjacent layers, small radial indentations in which the material that is used for the soldering is received.

This above arrangement makes possible in a simple manner to also wind in the soldering material, for example, soldering strips, in a known manner during the manufacturing. In the present invention, however, the wound or folded strips rest directly against one another, and the soldering material is present only in the intermediate areas in which the indentations are located without increasing the diameter of the matrix. The soldering material will then ensure the firm connection of the layers located on top of one another. In certain preferred embodiments of the present invention, the indentations are arranged in radial planes, in which the soldering strip or the soldering material is introduced in parallel to the feeding direction of the strips to be wound. In other preferred embodiments, the indentations extend spirally on the generating lines of the wound layers, so that a corresponding feeding of the soldering strip or the soldering material must be provided. This is relatively easy to implement.

The indentations, in a very simple manner, are created in a preferred process, for example, by a sufficiently firm soldering wire that is under a corresponding tensile stress which is wound into the matrix at the outer areas of the corrugations. As a result of the radial force caused by its tensile stress, the soldering wire presses itself into the relatively soft material of the corrugated strips, at least to such an extent that it does not protrude over the extreme areas of the corrugations. However, it is also contemplated to provide during the production of the corrugations of the metal strip that the corresponding indentations are pressed into the extreme areas of the corrugations. This may take place, for example, by a pair of indenters that, at its circumference, has surrounding ribs of small dimensions that press in the desired indentations either in the radial plane or in spiral form.

Other objects, advantages and novel features of the present invention will become apparent from the following detailed description of the invention when considered in conjunction with the accompanying drawings.

BRIEF DESCRIPTION OF THE DRAWINGS

FIG. 3 is a perspective and enlarged partial representation of indenters for producing a corrugated strip;

FIG. 4 is a perspective and diagrammatic view of a matrix constructed according to a preferred embodiment of the present invention;

FIG. 5 is a partial representation showing the pressing of a matrix of the present invention into a shell;

FIG. 6 shows a matrix constructed in accordance with a further preferred embodiment of the present invention.

DETAILED DESCRIPTION OF THE DRAWINGS

Figure 1:
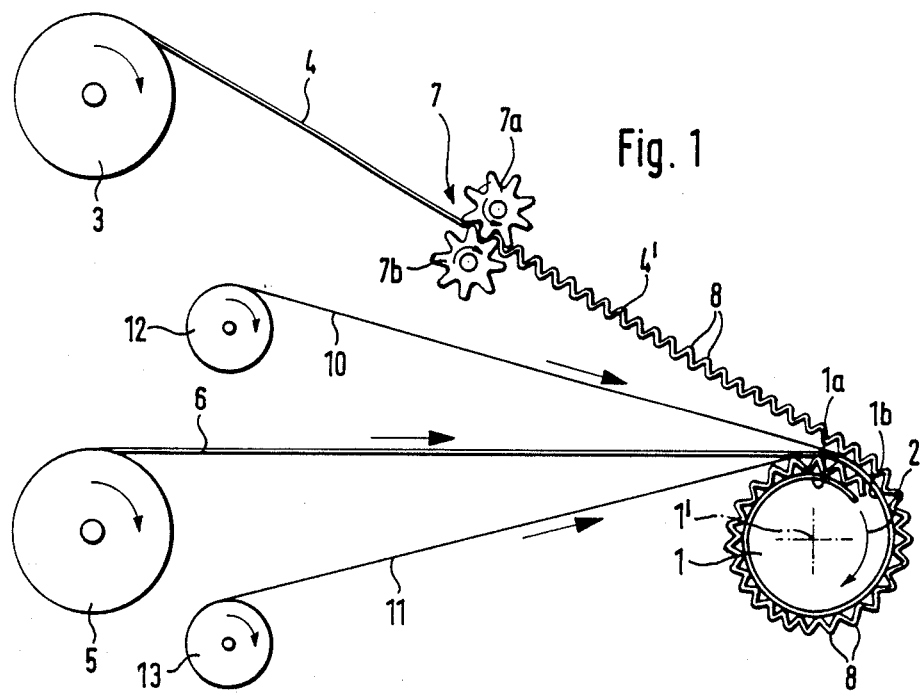
FIG. 1 is a diagrammatic representation of a continuous winding process for a matrix constructed according to preferred embodiments of the present invention that subsequently is fed to a soldering furnace.

In FIG. 1, a preferred embodiment of a winding arrangement is shown diagrammatically by which a smooth metal strip 6 and a corrugated metal strip 4' are wound into a matrix 1 in several layers 1a, 1b. The winding device turns the individual strips in the direction of the arrow 2 around the winding axis 1'. The metal strips 4 and 6 that are respectively wound off a coil 3 and 5, are first both formed as smooth strips. However, strip 4 passes through a pair 7 of indenters, the upper indenter 7a and the lower indentor 7b engaging strip 4 in such a way that the strip 4, when passing through the pair 7 of indenters, receives the desired corrugated form 4′.

Between the individual layers 1a, 1b of the correspondingly wound matrix 1, a soldering wire 10 and 11 or a soldering foil is also wound that, in each case, is continuously wound off a roller 12 and 13. The individual layers of the smooth strip 6 and of the corrugated strip 4′ support one another at the areas 8 that are formed by the wave crests.

of the corrugated strip 4′ that in each layer are located the furthest to the outside. In the shown embodiment, the corrugations extend in parallel to the winding axis 1′. Therefore, a line contact takes place between the strips 4′ and 6 at the generating lines of the individual layers 1a, 1b that extend in parallel to the winding axis 1′.

Figure 2:
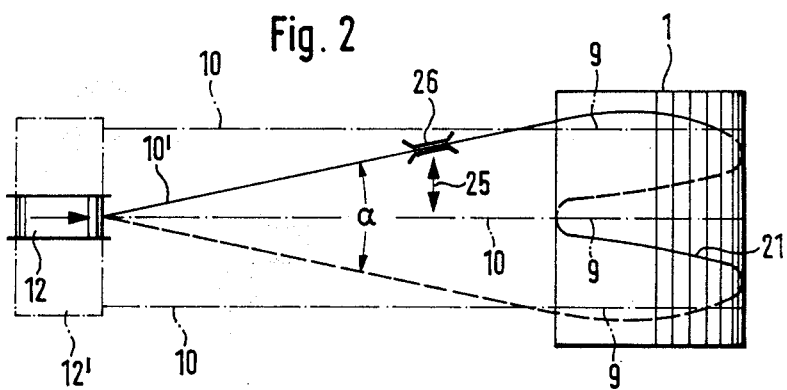
FIG. 2 is a top view of the diagrammatic device of FIG. 1, in which a number of parts of FIG. 1 are omitted for clarity with a feeding device for soldering wire or soldering foil also shown.

FIG. 2 shows that the feeding of the soldering wire 11 is carried out by a guiding roller 12 that in FIG. 2 is shown by an interrupted or drawn-out line, the feeding of the soldering wire of foil 10 taking place analogously. In this embodiment, at least two possibilities exist for the feeding of the soldering wire 10 or 10′. As indicated by a dash-dotted line, in one preferred embodiment, the soldering wire 10 is withdrawn at three axially displaced points of the correspondingly wide guiding roller 12′ and then extends in radial planes. The soldering wire 10 is placed in these radial planes in indentations 9 that will be explained by means of FIGS. 3 and 4. However, in another preferred embodiment, the soldering wire 10′ or the soldering foil is wound off a stationary roller 12 so that the soldering wire 10′ is wound alternately at an angle ($\alpha$) between the layers of the matrix 1. This is achieved by a guiding device 26 that moves back and forth in the direction of the arrows 25. This guiding device 26 ensures that the soldering wire 10′ or the soldering foil are wound, for example, spirally between the layers of the matrix 1 along the line 21 which, as will be explained later, is also an indentation in the extreme areas 8 of the respective corrugated strip 4′.

The indentations 9 extending in the radial planes in the areas 8 of the corrugated strip 4′ as well as the indentations 21 may, in a very simple manner, be created such that a soldering wire 10, 10′ of a corresponding tensile strength is used that comes from the spool 12 or 12′, and is introduced between the layers 1a, 1b of the matrix 1 under a tensile stress. The soldering wire 10, 10′ is under such a stress that, because of the radial forces exercised on the corrugations of the metal strip 4′ in the extreme areas 8, it presses itself into these corrugations. The soldering wire 10, 10′ is pressed into corrugations at least to such an extent that it does not protrude beyond the radially most extreme border of these areas 8 of the corrugations.

The above described method is used for introducing soldering wire 10, 10′ into indentations 9 that extend in radial planes. It may also be used when the soldering wire over the axial length is wound alternately between the layers 1a, 1b by the guiding device. In both cases, the tensile stress may be sufficient in order to have the soldering wire 10, 10′ itself form the indentations 9 or 21. The strips 4′ and 6 of the thus wound matrix therefore rests directly against one another. It changes its diameter neither during the winding process, nor subsequently during the soldering process in the soldering furnace, where the soldering wire melts and, starting from the indentations it formed itself, distributes itself into the adjacent areas. All adjacent layers of the new matrix are therefore solderable together on partial areas over the whole axial length of the matrix.

When a thin soldering foil in the form of a soldering strip is used, the above-described method is not as easy to achieve. If a soldering strip is used in a preferred embodiment shown in FIGS. 3 to 5, the indenters 7a, 7b are equipped with corresponding elevations in the form of surrounding ribs 14 or surrounding indentations 15 which in FIG. 3 are shown with exaggerated dimensions. When it is taken into account that soldering foils have thicknesses of only fractions of millimeters, it becomes clear that the height of the ribs 14 or the depth of the grooves 15 may be very low.

In the embodiment of FIG. 3, the indentations 9 are produced by the corresponding mating ribs 14 and indentations 15 and extend in radial planes. However, embodiments are also contemplated in which the grooves 15 and ribs 14 extend spirally at the circumference of the indenters 7a, 7b, so that also then the spiral course of the indentations 21 are achieved. Into the indentations 9 shown in FIG. 4, soldering foil is then placed in the manner illustrated in FIGS. 1 and 2. Although this soldering foil also ensures a perfect soldering-together o the individual layers in areas that are distributed over the whole axial length of the matrix, it is arranged such that it does not result in a change of diameter either during the winding process, or during the later soldering process.

An advantage of the matrix that is produced according to the present invention is that it has strips of soldering material 10 that surround it in radial planes also at its outer circumference. This construction, after the matrix 1 is pressed in the direction of the arrows 20 into a shell 18 and heated in a soldering furnace, provides a perfect connection of the matrix with the shell. The pressing-in process is facilitated by a conical inserting ring 19 in a known manner.

FIG. 6 shows a further preferred embodiment in which, at the extreme circumference, a soldering strip 17 is wound on the matrix 1 in the manner of a belt which, however, is also placed in a surrounding indentation. Like the surrounding soldering material 10, this wide soldering strip 17, after the pressing of the matrix 1 into a shell 18, also ensures a close connection with the shell 18 when the thus prepared matrix is heated in a soldering furnace and is subsequently cooled again.

Figure 7A:
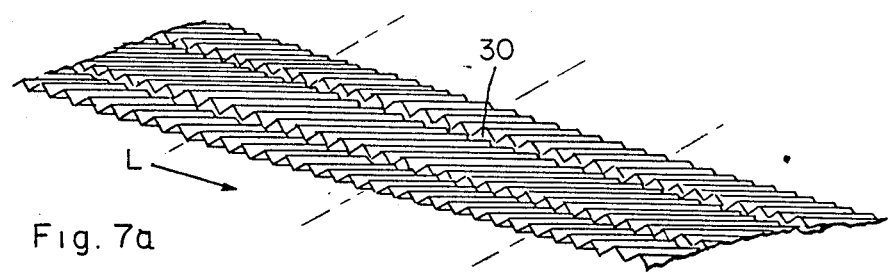
FIG. 7a schematically shows a carrier matrix strip constructed in accordance with the present invention which is to be folded instead of wound.
Figure 7B:
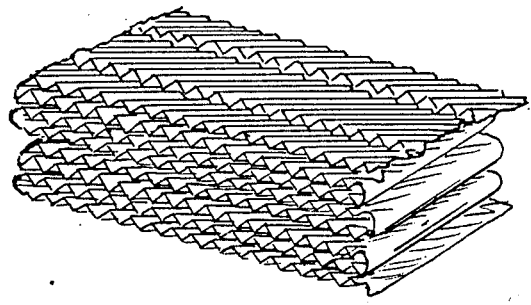
FIG. 7b shows the strip of FIG. 7a in a folded state.
Figure 7C:
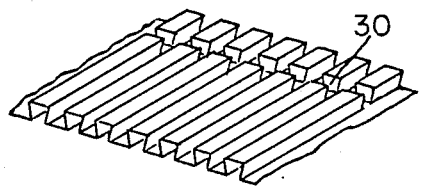
FIG. 7c shows another preferred embodiment of a carrier matrix strip which can be folded.

FIG. 7b schematically shows a preferred embodiment of a matrix that is folded in a known manner into several layers instead of wound. The indentations and soldering material are introduced in the folding process according to the present invention in a manner analogous to that described above with regard to the wound matrix. FIG. 7a shows the matrix of FIG. 7b prior to folding, the corrugations running obliquely to the length L of the strip. The recesses for the soldering material have reference numerals 30. Finally, in FIG. 7c an embodiment with a different configuration for the corrugations is illustrated. In both embodiments of FIGS. 7a14 c, a single corrugated sheet is used for the matrix, and no smooth sheet is necessary to prevent the corrugations from being folded into one another, either because of the oblique angling or the configuration of the corrugations.

Although the present invention has been described and illustrated in detail, it is to be clearly understood that the same is by way of illustration and example only, and is not to be taken by way of limitation. The spirit and scope of the present invention are to be limited only by the terms of the appended claims.

What is claimed:

1. A process for producing a matrix for a catalytic reactor for the purification of exhaust gas for internal combustion engines, having at least one of a corrugated strip and a smooth metal strip that is wound into several layers which are adjacent to one another and at least partially soldered to one another by soldering material, the corrugated strip including small indentations at areas of the corrugated strip that border on the adjacent layers, these indentations receiving said soldering material, in which the matrix is produced by winding, the process comprising the steps:

continuously winding-in fed soldering wire during said winding of said matrix into said layers to be soldered together under a tensile stress such that said soldering wire presses the indentations directly into said corrugated strip due to radial forces caused by said tensile stress; and subsequently liquefying said soldering material in a furnace.

2. A process according to claim 1, wherein said indentations are configured to extend radially with respect to a winding axis when in a completed matrix.

3. A process according to claim 2, wherein said winding-in of soldering wire includes winding the soldering wire in a heleical pattern into corresponding helical pattern indentations at the corrugated strip.

4. A process according to claim 2, wherein said winding-in of soldering wire includes winding a plurality of soldering wires simultaneously into a corresponding plurality of indentations spaced axially from one another in the matrix being formed.

5. A process according to claim 1, wherein said corrugated strip is formed by passing a smooth strip between corrugating rollers with corrugation means for forming said corrugations.

6. A process according to claim 5, wherein said corrugating rollers are disposed for continually forming the corrugations in said corrugated strip as it is wound into the matrix.

7. A process according to claim 6, wherein said winding-in of soldering wire includes feeding said soldering wire between a smooth metal strip and a corrugated metal strip being wound together to form said matrix.

8. A process according to claim 1, further comprising soldering of the matrix to a support shell by said soldering wire disposed in the indentations of the radially outermost layer of corrugated strip forming the matrix.

9. A process for producing a matrix for a catalytic reactor for the purification of exhaust gas for internal combustion engines, having at least one of a corrugated strip and a smooth metal strip that is wound into several layers which are adjacent to one another and at least partially soldered to one another by soldering material, the corrugated strip including small indentations at areas of the corrugated strips that border on the adjacent layers, these indentations receiving said soldering material, in which the matrix is produced by winding, the process comprising the steps:

providing said corrugated strip with indentations before said winding;

placing at least one of a soldering wire or a soldering foil strip into said indentations during said winding; and liquefying said soldering material.

10. A process according to claim 9, wherein said indentations are configured to extend radially with respect to a winding axis when in a completed matrix.

11. A process according to claim 9, wherein said indentations are formed by passing a smooth strip between corrugating rollers with indenting means for forming said indentation.

12. A process according to claim 11, wherein said corrugating rollers are disposed for continually forming the corrugations in said corrugated strip as it is wound into the matrix.

13. A process to claim 9, further comprising soldering of the matrix to a support shell by said soldering material disposed in the indentations of the radially outermost layer of corrugated strip forming the matrix.

* * * * *